United States Patent [19]

King

[11] Patent Number: 5,577,706
[45] Date of Patent: Nov. 26, 1996

[54] WATER FAUCET WITH AUTOMATIC SHUT-OFF MECHANISM FOR WATER CONSERVATION

[76] Inventor: Robert J. King, R.D. #2, Cascade Rd., Lafayette, N.Y. 13084

[21] Appl. No.: 548,251

[22] Filed: Oct. 25, 1995

[51] Int. Cl.[6] .................................................. F16L 37/28
[52] U.S. Cl. .................................. 251/149.6; 251/149.1
[58] Field of Search ........................... 251/149.6, 149.1, 251/321, 149.7; 137/801

[56] References Cited

U.S. PATENT DOCUMENTS

| | | |
|---|---|---|
| 589,957 | 9/1897 | Buckpitt . |
| 634,537 | 10/1899 | McDermott et al. . |
| 1,141,768 | 6/1915 | Campbell, Jr. . |
| 1,268,160 | 6/1918 | Sammons . |
| 1,415,124 | 5/1922 | Skelly . |
| 2,181,758 | 11/1939 | Goon et al. ........................ 251/149.6 |
| 3,474,810 | 10/1969 | Welsh ............................ 251/149.7 X |
| 3,876,146 | 4/1975 | Pacheco ......................... 251/149.7 X |
| 4,476,892 | 10/1984 | Boyce . |
| 4,506,862 | 3/1985 | Spinosa et al. ................. 251/149.6 X |
| 4,510,969 | 4/1985 | Rodth . |
| 4,612,953 | 9/1986 | Caroll et al. ................... 251/149.6 X |
| 5,004,013 | 4/1991 | Beaston . |

Primary Examiner—Kevin Lee

[57] ABSTRACT

A water faucet with automatic shut-off for stopping water flow when a hose is removed from the faucet is provided with a housing member that includes an internal chamber, a water inlet port, and a water discharge port having a threaded distal end that is connectable to the end of a water hose. A slide valve is slideably retained within the water discharge port. The slide valve extends from slightly beyond the threaded distal end of the water discharge port into the internal chamber when in a normally closed condition. At least one aperture is formed adjacent the proximal end of the slide valve to allow flow through the slide valve from the internal chamber when the slide valve is moved into an open condition. A seating mechanism is provided adjacent the at least one aperture for preventing water flow from the internal chamber into the slide valve when the slide valve is in the normally closed condition. A bias biasing mechanism is provided to bias the slide valve toward the threaded distal end of the water discharge port.

19 Claims, 3 Drawing Sheets

WATER FAUCET WITH AUTOMATIC SHUT-OFF MECHANISM FOR WATER CONSERVATION

BACKGROUND OF THE INVENTION

1. Field of the Invention

This invention relates in general to water conservation and, in particular, to conservation of piped water used in camp sites and the like. More specifically, but without restriction to the particular embodiment hereinafter described in accordance with the best mode of practice, this invention relates to a water faucet provided with an automatic shut-off mechanism for stopping water flow when a hose is removed from the faucet.

2. Discussion of the Related Art

The art of flow control has been contributed to by a variety of different devices. For example, U.S. Pat. No. 1,268,160, issued to T. A. Sammons on Jun. 4, 1918 entitled "Automatic Cut-Off Valve and Faucet Mechanism", shows a device directed to provide quick and convenient means for shutting off the flow of water when it becomes necessary to remove a faucet. The Sammons device includes a connector which is threadable between a water supply fitting and a water faucet. As the water faucet is threaded into the connector, a poppet valve, normally closed by a spring, is open to unseat a shut-off valve against the poppet valve, and seats firmly therein to prevent water flow out of the water supply pipe. In the Sammons device, since the connector is downstream of the standard screw valve, the standard screw-valve can be accidentally opened, resulting in the undesirable water waste which is a problem addressed by the present invention.

In U.S. Pat. No. 1,14 1,768 issued to G. W. Campbell, Jr. on Jun. 1, 1915 entitled "Gas Cock", Campbell illustrates a gas cock directed to automatically opening communication between the cock and a conduit when the conduit is connected to the outlet of the gas cock. The Campbell device includes a tubular member gas outlet, a slide valve contained therein with gas ports provided at the proximal end thereof. The distal end of the slide valve is forced normally closed by a coil spring. The slide valve extends slightly beyond the tubular discharge member. The discharge member is provided with a tapered bore while the slide valve is similarly tapered in shape to allow a seal between the inlet gas ports and the inner circumference of the tapered tubular member. When a gas hose is fitted over the tapered discharge member, the expansion spring is compressed and the inlet ports moved laterally into a chamber downstream from the standard turn screw valve.

The oiling device disclosed by B. H. Skelly in U.S. Pat. No. 1,415,124 issued May 9, 1922, includes a nozzle having a conical valve contained therein biased normally closed against an internal neck portion of the nozzle. Downstream therefrom, a conical opening exists as provided to communicate with the exterior environment. The oiling device further includes a connector cup having at the bottom thereof a mating conical segment and a check ball valve contained within a conduit member thereof. When the cup member is inserted around the nozzle, the upwardly projecting mating segment of the cup member is directed into the cone shaped nozzle portion and opens the check-valve allowing oil to flow freely from the nozzle through the cup member. The flow of oil applies pressure to the check ball to allow passage of oil therethrough. The nozzle taken alone provides a similar function to the present invention. The check means, however, is contained completely interior within the nozzle as compared to the present invention. In addition, the Skelly device is applied to oil shut off rather than water conservation. Thus, the Skelly device is directed to an inwardly opening valve for arresting the flow of lubricant except when the valve is unseated by engagement with an oil slide or cup member.

The J. J. McDermott et al. reference, U.S. Pat. No. 634,537, issued Oct. 10, 1899, is directed to a safety connection for gas fixtures. The McDermott et al. device includes spring activated safety valves on both ends of a conduit. The distal end being attachable to an ordinary gas stove supply pipe and the proximal end being connectable to a gas fixture or supply pipe. The distal end of McDermott et al. safety connection includes a spring loaded valve connection having a valve stem projecting axially toward the gas inlet pipe of the stove. When the sleeve of the distal end connection is forced over a slide provided on the gas inlet pipe, the valve in the distal end of the conduit will be unseated as the tip of the slide forces against the connection with the stem valve. This motion will then cause the stem valve to slide into the slide of the gas stove inlet pipe. This connection forms a seal between the open end thereof and the internal tubular member containing the coil spring.

U.S. Pat. No. 589,957 issued to F. G. Buckpitt on Sep. 14, 1897 for a brake coupling device proposes a spring loaded valve mechanism for providing air pressure to keep the brakes of a respective freight or passenger car open. In the event of uncoupling, the brake cable will snap and separate and the valve mechanism will be activated to set the brakes on a respective car. The Buckpitt device further includes means for slowly setting the brakes so that they are not suddenly applied to potentially expose the car to derailment.

As shown in U.S. Pat. No. 4,510,969 issued to J. J. Rodth on Apr. 16, 1985, a connector for a pressurized source of a beverage concentrate is proposed. The Rodth connector is used for conveying beverage concentrate from a pressurized source to a dispenser. The connector includes counteracting springs for keeping a pair of poppet valves biased against each other. Fluid flow control is obtained by moving the valves relative to each other.

Two other patents, U.S. Pat. No. 4,476,892 for a dual purpose refrigerant connector issued to H. L. Boyce Oct. 16, 1984, and U.S. Pat. No. 5,004,013 for dripless coupling device issued to B. J. Beaston on Jun. 22, 1990 provide technical background in the general area of fluid flow control. The Boyce connector is directed to preventing the escape of fluids from either a Schroeder-type valve or a standard service type valve used for directing the flow of high pressure refrigerant fluids. The Beaston coupling device is directed to preventing leakage of fluids by use of a slide member that seals when placed in contact with a corresponding coupling member.

In connection with the present invention, the field of use is directed to water conservation in campground facilities or the like. In such campgrounds, water and electric hook-ups are typically provided for use by individuals and their campers. The electric connection is commonly a 110 volt line while the water hook-up is typically a common garden hose screw-type connector. The water and electrical supply lines are usually paired together on a common supply standard situated near a parking location for each of a number of individual campers. The electric power is used for powering all the electrical devices contained in the camper such as internal lighting, appliances, and battery recharging. The water supply is connected directly to the plumbing of the camper to supply water for the various necessities of camper living. Once the campers have completed their stay in the camp site, the water and electric connections are removed from the supply standard and the camper is freed to move away.

As would be readily apparent, once the electrical connection is disconnected, the flow or supply of electricity is necessarily terminated until a closed circuit is formed again. The water supply line, on the other hand, is a different matter. The prior art water supply valve is the typical outdoor water faucet commonly seen on any exterior wall of residential homes, for example. This type of exterior water faucet is commonly available in any type of hardware store or plumbing supply or distributer. This common exterior water faucet includes a hand-turn valve, a water inlet connectable to a supply line, and a supply nozzle connectable to a garden hose fitting. When this type of water faucet is used in campground facilities, departing campers oftentimes do not completely close the water faucet provided on the supply standard. In such campground sites, personnel is often limited while the parking locations for the individual are usually spread over a large area. Thus one or two running faucets may not be detected for quite some time. This can result in a relatively large amount of water waste and can be costly to the camp site providers. In addition thereto, many states are increasingly enacting water use, restriction, and conservation legislation to conserve this valuable resource.

OBJECTS AND SUMMARY OF THE INVENTION

It is, therefore, an object of the present invention to improve flow control devices.

Another object of this invention is to improve water faucets used in campground sites and the like.

It is a further object of the present invention to conserve the use of water.

Still another object of the present invention is to automatically stop water flow through a supply faucet when a hose fitting is disconnected therefrom.

It is still a further object of this invention to automatically start water flow through a supply faucet when a hose fitting is connected thereto.

Yet another object of the present invention is to reduce water expenses incurred by providers supplying water to a certain clientele.

An additional object of this invention is to reduce the necessity of monitoring proper use of water faucets provided in campground sites and the like.

Still a further object of the present invention is to eliminate the possibility of accidentally leaving a water faucet running by failing to turn closed a hand knob on an exterior water faucet.

These and other objects are attained in accordance with the present invention wherein there is provided a water faucet with automatic shut-off for stopping water flow when a hose is removed from the faucet. The water faucet is provided with a housing member that includes an internal chamber, a water inlet port, and a water discharge port having a threaded distal end that is connectable to the end of a water hose. A slide valve is retained within the water discharge port. The slide valve extends from slightly beyond the threaded end of the water discharge port into the internal chamber when in a normally closed condition. The slide valve further includes a distal end adjacent the threaded distal end of the water discharge port and a proximal end adjacent the internal chamber.

In accordance with one aspect of this invention, at least one aperture is formed adjacent the proximal end of the slide valve to allow flow through the slide valve from the internal chamber when the slide valve is moved into an open condition. According to another aspect of this invention, a seating mechanism is provided adjacent at least one aperture for preventing water flow from the internal chamber into the slide valve when the slide valve is in the normally closed condition. A bias biasing mechanism is provided to bias the slide valve toward the threaded distal end of the water discharge port. In this manner, the sealing mechanism is engaged while the slide valve is maintained in the normally closed condition.

Thus during use of the present water faucet, when the end of the water hose is connected to the threaded distal end of the water discharge port and tightened thereagainst, the extending portion of the slide valve will be moved into the water discharge port thereby unseating the seating mechanism and opening at least one aperture to allow water to flow from the internal chamber into the discharge port and then into the hose. In a similar manner, when the end of the water hose is disconnected from the threaded distal end of the water discharge port, the biasing mechanism will place the slide valve into the closed condition thereby preventing flow from the internal chamber into the water discharge port.

According to another aspect of this invention, a head member is positioned on the proximal end of the slide valve. At least one aperture is thereby located between the proximal end of the slide valve and the head member. In the preferred embodiment of the present water faucet, the head member is formed in the shape of a sphere and a plurality of apertures are formed between the sphere-shaped head member and the proximal end of said slide valve. The preferred embodiment of the biasing mechanism includes a spring positioned between the head member and a back wall of the internal chamber. The spring thus provides a force against the head member so that the seating mechanism is normally engaged.

BRIEF DESCRIPTION OF THE DRAWING

Further objects of the present invention together with additional features contributing thereto and advantages accruing therefrom will be apparent from the following description of a preferred embodiment of the invention which is shown in the accompanying drawing with like reference numerals indicating like components throughout, wherein.

DETAILED DESCRIPTION OF A PREFERRED EMBODIMENT

Figure 1:
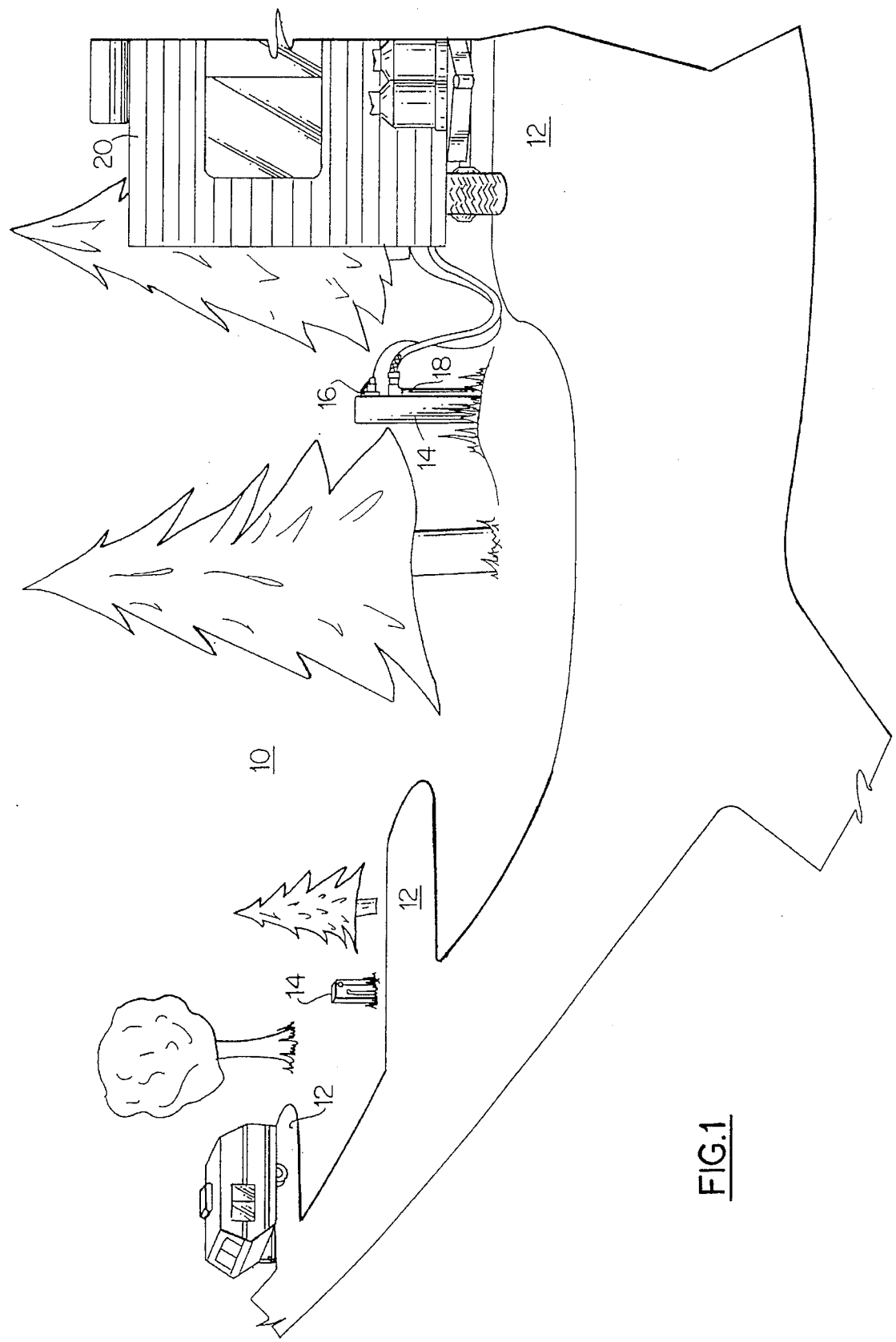
FIG. 1 is a is a pictorial representation of a camp site facility showing use of a water and electric supply standard associated with each parking location for a respective camper.

Referring now to FIG. 1 there is shown a pictorial representation of a camp site 10 including a number of parking locations 12 each provided with a supply standard 14 having an electrical supply line or hook-up 16 and a water supply connection 18. A camper 20 is shown connected to a representative supply standard 14. Although the present invention will be described with reference to a campsite, it should be clear that it has wider application and can be used in any type of facility where water conservation is a problem.

Figure 2:
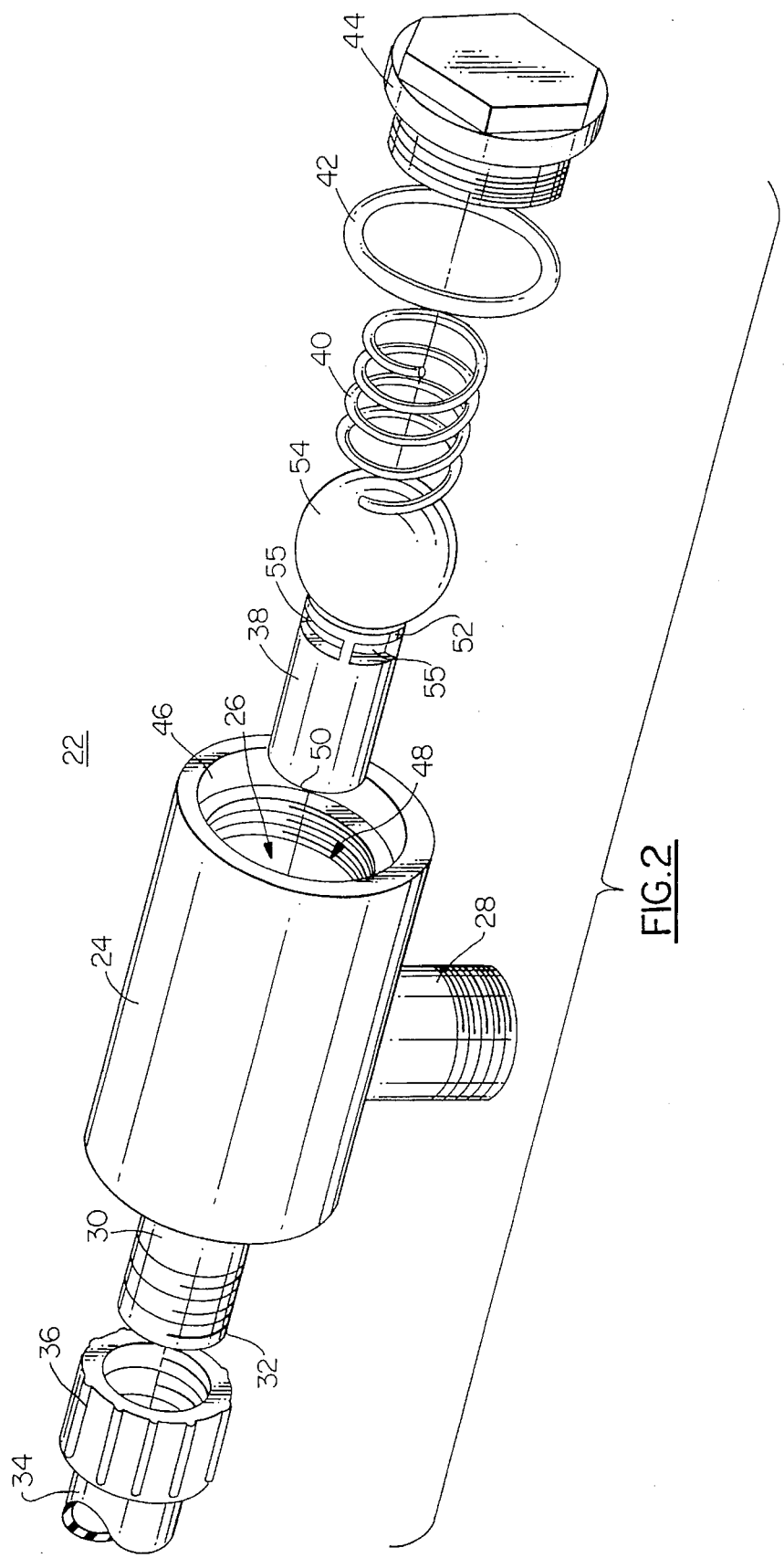
FIG. 2 is an exploded perspective view of a water faucet according to the preferred embodiment of the present invention.

With reference now to FIG. 2, there is illustrated a water faucet 22 in accordance with the teaching of the present invention. The water faucet 22 includes a housing 24 which is provided with an internal chamber 26, a water inlet port 28, and a water discharge member 30 having a discharge port passing therethrough and a threaded shank 32. A common garden hose 34 having a standard female connector fitting 36 is connectable to the threaded distal end 32 of the discharge port 30 in a manner to be fully described below. A slide valve 38 is movably retained within the water discharge port 30. The outside diameter of the slide valve 38 is selected to substantially match the inside diameter of the discharge port 30 to provide a close sliding fit and thus restrict the flow of water therebetween. The slide valve 38 is held within the discharge port and internal chamber 26 by a spring 40, an O-ring seal 42, and a threaded plug 44. The slide valve 38 is preferably cylindrical in form and is machined from a single piece of metal to the desired shape and dimensions. As shown in FIG. 2, the housing member 24 includes a back wall 46 which is provided with a threaded opening 48. The water faucet 22 is quickly assembled by inserting the slide valve 38 through the opening 48, then through and into the internal chamber 36 to be positioned for sliding into the discharge port 30. Thereafter the spring 40 is loaded and positioned within the internal chamber 26. The assembly is then completed by placing the O-ring seal 42 around the threaded shank of plug 44 and tightening the plug into the threaded opening 48. This will place the spring 40 under compression. The preferred materials for the housing member 25 and slide valve 38 include brass or chrome plated steel, however, plastic can also be used.

Figure 5:
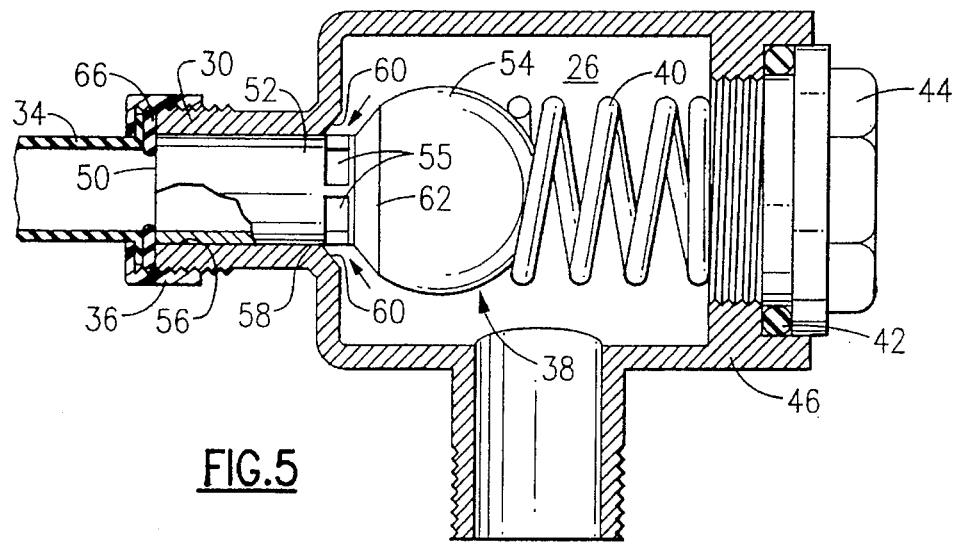
FIG. 5 is a side elevation view, similar to FIGS. 3 and 4, also taken in partial section and showing the hose end fully tightened against the discharge port to place the slide valve of the present invention in an open condition to allow water to flow from the chamber, through the discharge port, and into the hose.
Figure 3:
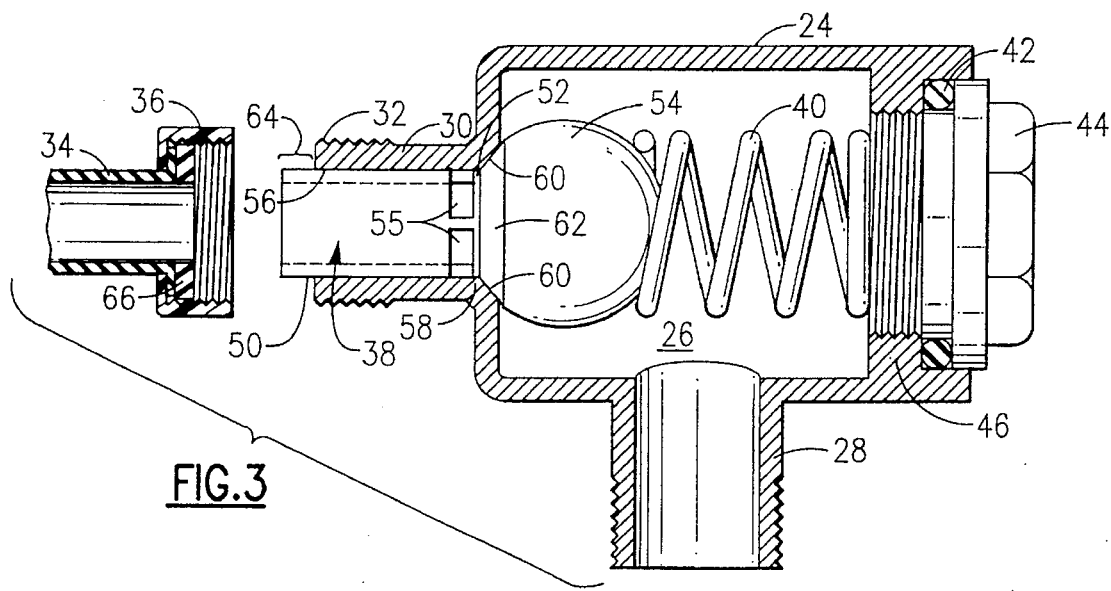
FIG. 3 is a side elevation view taken in partial section showing the end of a hose disconnected from the water faucet of this invention in a normally closed condition.
Figure 4:
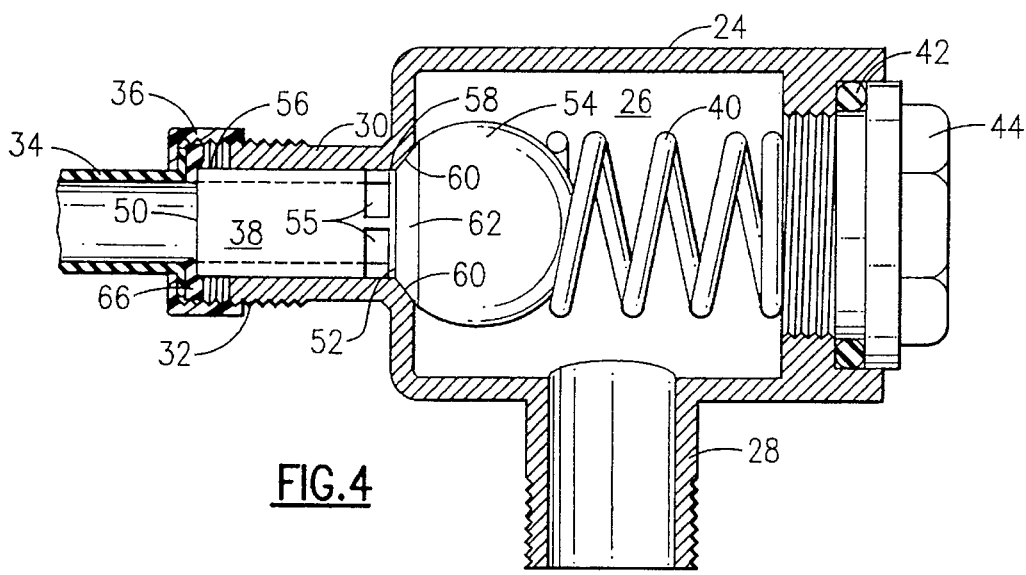
FIG. 4 is a side elevation view, similar to FIG. 3, also taken in partial section and illustrating the end of a hose partially connected to the distal end of the discharge port of the water faucet of the present invention while the seating mechanism is still engaged to prevent water flow from the internal chamber into the discharge port.

The function and additional structure of the water faucet 22 will now be described initially with reference to FIGS. 2–5. The slide valve 38 includes a flat distal end face 50, and is provided with a ball member 54 which is preferably spherical in shape. In a similar manner, the discharge member shank includes a corresponding distal end face 56 and a proximal end 58 As illustrated, the head member 54 is integral with the proximal end 52 of the slide valve 38. A plurality of flow apertures 55 allows the internal chamber 26 to open into the port of the slide valve 38, when the valve is in the open condition shown in FIG. 5. As best shown in FIG. 5 the proximal end 58 of the discharge port 30 is provided with a valve seat 60. In a similar manner, the ball member 54 includes a corresponding mating surface 62. The seats 60 and 62 combine to form a closure mechanism which, when engaged as shown in FIGS. 3 and 4, prevents water flow from the internal chamber 26 into the discharge port 30.

As would be apparent in view of the above discussion, installation of the water faucet 22 involves connecting the inlet 28 to a water supply line such as water supply 18 shown in FIG. 1. When the water faucet 22 is thus installed, it will necessarily take the normally closed condition shown in FIG. 3. In this normally closed condition, water under supply pressure, which is typically at 40 to 50 psi, is contained within the inlet 28 and within the internal chamber 26. This closed condition is maintained by the extension effect of the spring 40 placing a force against the ball member 54 to seat the beveled surfaces 60 and 62 against each other. In this condition, the slide valve 38 extends slightly beyond the threaded distal end 32 of the water discharge port 30. The length of this extended portion 64 is critical to the proper functioning of the water faucet 22. The length of the slide valve 38 is selected so that the extended portion 64 has a length of approximately 2 ½ threads as formed on the distal end 32. As shown in FIGS. 3–5, the hose connector fitting 36 is provided with a rubber washer 66. The length of the connector fitting 36 from the exposed surface of the rubber washer 66 to the flush open end of the connector fitting is also approximately 2 to 2½ threads.

To access water from the water faucet 22, the female hose connector fitting 36 is threaded onto the distal end 32 of the discharge member until the rubber washer 66 first comes in contact with the distal end 32. This condition is shown in FIG. 4 and requires about 1 to 1½ turns of the hose connector. At this point, the connector fitting 36 is tightened further to squeeze the rubber washer 66 by approximately the same amount. This will place the slide valve 38 in the fully open condition shown in FIG. 5. As the connector fitting 36 is tightened in this manner the resistance provided by the rubber washer 66 and the spring 40 will be felt as compared by the initially turning of the first few threads in connector fitting 36. While this tightening is proceeding, the extending portion 64 of the slide valve 38 will move inwardly toward the internal chamber 26 thereby unseating the ball from the valve seat thus moving the plurality of apertures 55 from the closed condition of FIGS. 3 and 4, to the open condition illustrated in FIG. 5. As should now be apparent, when the connector fitting 36 is unscrewed form the discharge port 30, the biasing effect of the spring 40, will move the slide valve 38 into the closed condition of FIG. 4 seating the ball against the seat. There has thus been shown and described a new and useful water faucet which provides easy access to a limited number of easily machined and designed internal components. The spring may be selected to have different compression characteristics depending on the specific application and pressure of water supply.

The present faucet arrangement can be easily tested by simply depressing the extended portion 64 of the sliding valve. The sliding valve can be easily moved to an operative position using ordinary hand pressure. The valve port 30 is also specifically configured so that water passing through the faucet is directed toward the center of the hose to provide for an efficient flow stream between the faucet and the hose. To this end, the elongated port 30 can be tapered slightly so that the flow stream converges toward the center of the hose. Although the housing 24 is shown in the preferred embodiment as containing a tapered end plug 44, the plug can be eliminated and alternate methods of machining and assembly employed without departing from the teachings of the present invention.

While this invention has been described in detail with reference to a preferred embodiment, it should be appreciated that the present invention is not limited to that precise embodiment. For example a variety of different seating arrangements between the head member and discharge port are practicable as well as different geometries for configuration of the head member. Thus, in view of the present disclosure which describes the best mode for practicing the invention, many modifications and variations would present themselves to those of skill in the art without departing from the scope and spirit of this invention, as defined in the following claims.

What is claimed is:

1. A water faucet with automatic shut-off for stopping water flow when a hose is removed from the faucet, said water faucet comprising:

a housing member including an internal chamber, a water inlet port, and an elongated water discharge port having a threaded distal end being connectable to an end of a water hose;

a slide valve slideably retained within said water discharge port, for movement between an open and closed position, said slide valve extending from beyond said threaded distal end of said water discharge port back into said internal chamber when in a normally closed position, said slide valve further including a distal end adjacent said threaded distal end of said water discharge port and a proximal end adjacent said internal chamber;

at least one aperture formed in said proximal end of said slide valve to allow water to flow through said internal chamber and said slide valve when said slide valve is moved into an open position;

seating means formed adjacent said at least one aperture, said seating means for preventing water flow from said internal chamber into said slide valve when said slide valve is in said normally closed condition; and biasing means for urging said slide valve toward said closed position to engage said sealing means while said slide valve is maintained in said normally closed position so that when said end of said respective water hose is connected to said threaded distal end of said water discharge port and tightened thereagainst, said extending portion of said slide valve will be moved into said discharge port thereby unseating said seating means and opening said at least one aperture, and when said end of said respective water hose is disconnected from said threaded distal end of said water discharge port, said biasing means will place said slide valve in said closed position thereby preventing water to flow from said internal chamber through said water discharge port.

2. The water faucet according to claim 1 further including a ball element positioned on said proximal end of said slide valve, said at least one aperture thereby being located between said proximal end of said slide valve and said ball element.

3. The water faucet according to claim 2 wherein said ball element is formed in the shape of a sphere and a plurality of apertures are formed between the sphere-shaped ball element and said proximal end of said slide valve.

4. The water faucet according to claim 2 wherein said biasing means includes a spring positioned between said ball element and a back wall of said internal chamber, said spring providing a force against said ball element to engage a ball seat in said housing.

5. The water faucet according to claim 4 wherein said ball seat includes a contoured surface formed around said proximal end of said discharge port and a mating surface formed in said ball element.

6. The water faucet according to claim 3 wherein said seating means includes a contoured surface formed around said proximal end of said discharge port and a mating surface formed around said ball element and said biasing means includes a spring positioned between said ball element and a back wall of said internal chamber, said spring providing a force against said ball element so that said contoured surfaces are normally engaged to prevent flow therebetween.

7. The water faucet according to claim 4 wherein said back wall includes an opening and a plug sealing said opening to prevent flow therethrough, said opening having a diameter larger than the diameter of said slide valve and said ball element so that said slide valve and said ball element are removable from said discharge port, through said internal chamber, and out of said internal chamber through said opening when said plug is removed therefrom.

8. The water faucet according to claim 7 wherein said opening is a threaded opening and said plug is a threaded plug further including an O-ring seal.

9. The water faucet according to claim 1 wherein said water inlet port is positioned substantially perpendicular to said water discharge port.

10. The water faucet according to claim 1 wherein the portion of said slide valve extending from slightly beyond said threaded distal end of said water discharge port has a predetermined length so that when said predetermined length is moved into said discharge port, said at least one aperture is moved from within said discharge port into said internal chamber.

11. A water faucet with automatic shut-off for stopping water flow when a hose is removed from the faucet, said water faucet comprising:

a housing member including an internal chamber, a water inlet port, and an elongated water discharge port having a threaded distal end being connectable to an end of a respective water hose;

a slide valve slideably retained within said water discharge port to move between an open and closed position, said slide valve extending from slightly beyond said threaded distal end of said water discharge port into said internal chamber when in a normally closed position, said slide valve further including a distal end adjacent said threaded distal end of said water discharge port and a proximal end adjacent said internal chamber and formed from an elongated hollow member;

a ball element formed on said proximal end of said elongated hollow member, at least one aperture formed in said elongated member between said proximal end of said member and said ball element to allow flow through said internal chamber and said elongated member when said slide valve is moved into an open position;

seating means formed adjacent said at least one aperture, said seating means for preventing water flow from said internal chamber into said slide valve when said slide valve is in said normally closed position; and biasing means for biasing said slide valve toward said threaded distal end of said water discharge port to engage said sealing means when said slide valve is in said normally closed position so that when said end of said respective water hose is connected to said threaded distal end of said water discharge port and tightened thereagainst, said extending portion of said slide valve is moved into said water discharge port thereby unseating said seating means and opening said at least one aperture to the internal member, and when said end of said respective water hose is disconnected from said threaded distal end of said water discharge port, said biasing means places said slide valve in said closed position thereby preventing flow from said internal chamber into said water discharge port.

12. The water faucet according to claim 11 wherein said ball element is formed in the shape of a sphere and a plurality of apertures are formed between the ball element and said proximal end of said slide valve.

13. The water faucet according to claim 11 wherein said biasing means includes a spring positioned between said ball element and a back wall of said internal chamber, said spring providing a force against said ball element so that said seating means is normally engaged.

14. The water faucet according to claim 13 wherein said seating means includes a contoured surface formed around said proximal end of said discharge port and a mating contoured surface formed around said ball element.

15. The water faucet according to claim 12 wherein said seating means includes a contoured surface formed around said proximal end of said discharge port and a mating surface formed around said ball element and said biasing means including a spring positioned between said ball element and a back wall of said internal chamber, said spring providing a force against said ball element so that said contoured surfaces are normally engaged to prevent flow therebetween.

16. The water faucet according to claim 13 wherein said back wall includes an opening and a plug sealing said opening to prevent flow therethrough, said opening having a diameter larger than the diameter of said slide valve and said ball element so that said slide valve and said ball element are removable from said discharge port, through said internal chamber, and out of said internal chamber through said opening when said plug is removed therefrom.

17. The water faucet according to claim 16 wherein said opening is a threaded opening and said plug is a threaded plug having an O-ring seal positioned thereon.

18. The water faucet according to claim 11 wherein said water inlet port is positioned substantially perpendicular to said water discharge port.

19. The water faucet according to claim 11 wherein the portion of said slide valve extending from slightly beyond said threaded distal end of said water discharge port has a predetermined length so that when said predetermined length is moved into said discharge port, said at least one aperture is moved from within said discharge port into said internal chamber.

* * * * *